(12) United States Patent
Hartwick et al.

(10) Patent No.: US 9,064,195 B2
(45) Date of Patent: Jun. 23, 2015

(54) MULTIPLE LAYER CARD CIRCUIT BOARDS

(71) Applicants: David Joseph Hartwick, Aliquippa, PA (US); Gautam Batra, Pittsburgh, PA (US)

(72) Inventors: David Joseph Hartwick, Aliquippa, PA (US); Gautam Batra, Pittsburgh, PA (US)

(73) Assignee: DYNAMICS INC., Pittsburgh, PA (US)

( * ) Notice: Subject to any disclaimer, the term of this patent is extended or adjusted under 35 U.S.C. 154(b) by 124 days.

(21) Appl. No.: 13/770,553

(22) Filed: Feb. 19, 2013

(65) Prior Publication Data

US 2014/0001269 A1    Jan. 2, 2014

Related U.S. Application Data

(60) Provisional application No. 61/666,553, filed on Jun. 29, 2012.

(51) Int. Cl.
| | |
|---|---|
| *G06K 19/02* | (2006.01) |
| *G06K 19/06* | (2006.01) |
| *G06K 19/077* | (2006.01) |
| *G06K 19/04* | (2006.01) |
| *G06K 19/07* | (2006.01) |

(52) U.S. Cl.
CPC .... *G06K 19/06206* (2013.01); *G06K 19/07722* (2013.01); *G06K 19/042* (2013.01); *G06K 19/0702* (2013.01); *G06K 19/07707* (2013.01); *G06K 19/07749* (2013.01)

(58) Field of Classification Search
CPC .......... G06K 19/077; G06K 19/07749; G06K 19/0772; G06K 19/02; G06K 19/07745; G06K 19/06187; G06K 19/0723; G06K 19/07; G06K 19/0702; G06K 19/07771; G06K 19/07783; G06K 19/041; G06K 19/072; G06K 19/07732; G06K 19/07779
USPC ................. 235/488, 380, 492, 486, 487, 493
See application file for complete search history.

(56) References Cited

U.S. PATENT DOCUMENTS

| | | | |
|---|---|---|---|
| 4,353,064 | A | 10/1982 | Stamm |
| 4,394,654 | A | 7/1983 | Hofmann-Cerfontaine |
| 4,614,861 | A | 9/1986 | Pavlov et al. |
| 4,667,087 | A | 5/1987 | Quintana |
| 4,701,601 | A | 10/1987 | Francini et al. |
| 4,720,860 | A | 1/1988 | Weiss |
| 4,786,791 | A | 11/1988 | Hodama |
| 4,791,283 | A | 12/1988 | Burkhardt |
| 4,797,542 | A | 1/1989 | Hara |
| 5,038,251 | A | 8/1991 | Sugiyama et al. |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, filed Mar. 2005, Poidomani et al.

(Continued)

*Primary Examiner* — Thien M Le (57) ABSTRACT

A powered card may include a circuit board with multiple layers, and may include multiple reader communication devices. One of the layers may include an RFID antenna. The layer including the RFID antenna may occupy an entire region of a card outside of a region including a magnetic stripe communication device.

22 Claims, 7 Drawing Sheets

(56) References Cited

U.S. PATENT DOCUMENTS

| | | |
|---|---|---|
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,866,949 A | 2/1999 | Schueller et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,137,687 A * | 10/2000 | Shirai et al. .................. 361/749 |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,295,031 B1 * | 9/2001 | Wallace et al. ............... 343/702 |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,122,447 B2 | 10/2006 | Abe |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 8,011,577 B2 | 9/2011 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |

(56) References Cited

U.S. PATENT DOCUMENTS

| | | |
|---|---|---|
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0040242 A1* | 2/2005 | Beenau et al. ............... 235/492 |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0231611 A1 | 10/2006 | Chakiris et al. |
| 2006/0256961 A1 | 11/2006 | Brainard et al. |
| 2007/0034700 A1* | 2/2007 | Poidomani et al. ........... 235/492 |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0230793 A1 | 9/2010 | Kudose et al. |
| 2010/0270373 A1* | 10/2010 | Poidomani et al. ........... 235/380 |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, filed Mar. 2005, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A, 1993.
USPTO, International Search Report, Jun. 28, 2013.

* cited by examiner

MULTIPLE LAYER CARD CIRCUIT BOARDS

CROSS-REFERENCE TO RELATED APPLICATION

This application claims the benefit of U.S. Provisional Patent Application No. 61/666,553, titled "MULTIPLE LAYER CARD CIRCUIT BOARDS," filed Jun. 29, 2012, which is hereby incorporated by reference herein in its entirety.

BACKGROUND OF THE INVENTION

Example embodiments relate to transaction cards, devices and transaction systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader. A magnetic emulator may include one or more coils. Each coil may be utilized to communicate a particular track of magnetic stripe data to a magnetic stripe track read-head of a magnetic stripe reader. For example, two coils may be utilized to communicate two tracks of magnetic stripe data to two read-heads inside a read-head housing.

A dynamic magnetic stripe communications device may be fabricated and assembled on one board at one facility (e.g., as a component of a card) while a different facility may fabricate and assemble a different board with, for example, a card's processor, dynamic magnetic communications device driver circuitry, user interfaces, read-head detectors, light emitting devices, displays, batteries, and any other type of sensor, device, or associated circuitry. The facility fabricating the board having a card's primary circuitry may receive the board having the dynamic magnetic stripe communications device from a different facility and a battery, and may assemble the two boards and the battery together.

The combined electronics package may then, for example, be provided to a lamination facility for lamination. Alternatively, for example, lamination may occur at the facility that assembled the dynamic magnetic stripe communications device board and the primary circuit board together. The laminated card may then be provided to a personalization facility for personalization. During personalization, for example, a customer's personal data may be placed on the exterior of the card (e.g., printed, embossed, or laser etched) as well as programmed into a processor's memory.

The primary circuit boards for different types of cards may be manufactured independently of the dynamic magnetic communications devices. Accordingly, different facilities may be dedicated to manufacturing different types of cards. One facility, for example, may be dedicated to the manufacture of primary card boards for payment cards having displays. Another facility, for example, may be dedicated to the manufacture of primary card boards for security cards not having any displays. In this manner, dynamic magnetic stripe communications devices may be fabricated at dedicated facilities in high volume. These dynamic magnetic stripe communication devices may then be shipped to the various other facilities fabricating the primary boards for different types of cards.

In manufacturing multiple boards dedicated to particular functions, and later assembling these multiple boards together, for example, the reliability of the different boards may be tested separately before assembling. Additionally, for example, the dynamic magnetic communication device boards may be fabricated in a higher volume than the boards for the circuitry of any one card. In doing so, the costs associated with the fabrication of dynamic magnetic communication device boards may be decreased.

A primary circuit board may include multiple layers (e.g., three layers) and may be configured to support multiple devices. For example, a multi-layer circuit board may include a processor, a display, driving circuitry, buffer circuitry, buttons, a memory, a battery, a radio frequency identification (RFID) chip (and associated circuitry), an integrated circuit (IC) chip (and associated circuitry), external connectors, ports, antennas, electromagnetic field generators (and associated circuitry), read-head detectors and/or the like.

The buttons (e.g., one or more buttons) may be part of the primary circuit board and/or may be separate components. The buttons may each be associated with a different transaction account or feature. Alternatively, for example, a card may include a single button, but that single button may be used to, for example, toggle between multiple products.

The processor may be any type of processing device and may include on-board memory for storing information. Any number of components may communicate with the processor. For example, one or more displays may be coupled to the processor. A display driver circuit may be coupled between the display and the processor. A memory may be coupled to the processor. The memory may store data such as discretionary data codes associated with buttons of a card. Discretionary data codes may be recognized by remote servers to effect particular actions. For example, a discretionary data code may be stored in the memory and may be used to cause a third party service feature to be performed by a remote server.

A card may include any number of reader communication devices. For example, a card may include an IC chip (which may be implemented by the processor), an RFID chip and/or a magnetic stripe communications device. The IC chip (e.g., an EMV chip) may be used to communicate information to an IC chip reader through a connector (contact) or antenna (contactless). The RFID chip may be used to communicate information to an RFID reader via an antenna. The magnetic stripe communications device may be included to communicate information to a magnetic stripe reader. For example, a magnetic stripe communications device may provide electromagnetic signals to a magnetic stripe reader.

The multiple layer circuit board may include read head detectors configured to sense the presence of a magnetic stripe reader (e.g., a read-head housing of a magnetic stripe reader). Information sensed by the read-head detectors may be communicated to the processor to cause the processor to communicate information serially from electromagnetic generators to magnetic stripe track receivers in a read-head housing of a magnetic stripe reader. Driving circuitry may be utilized by the processor, for example, to control the electromagnetic generators.

A circuit board with multiple layers may include devices distributed across the layers in order to maintain thickness targets, avoid and/or prevent interference between components, improve device performance and/or the like. For example, a first layer of a circuit board may include an RFID chip, buttons, a processor, an IR transceiver, an application specific integrated circuit associated with a dynamic magnetic stripe communications device, battery pads, a test/communication port (e.g., a JTAG port), an EMV buffer, supporting circuitry, backers and/or the like. A second layer may include copper supports for the port, a copper pad operable as a die foundation for the on-board wire bonded ASIC of the first layer, head readers (e.g., e-sense pads), supporting circuitry, backers and/or the like. A third layer may include an external connector (e.g., an EMV connector), an RFID antenna, supporting circuitry, backers and/or the like.

Each of the layers of the circuit board may be differently shaped, include cutouts and/or may be of different sizes. For example, the first layer of the circuit board may be generally sized proportionally to a card and may include cutouts (e.g., cutouts, etched portions, and/or the like) for a magnetic stripe communications device and a battery. A border may remain around the cutout for the magnetic stripe communications device. The cutout for the battery may not include a border and may result in an "L" shaped layer. The second layer may be a middle layer of the circuit board that is generally sized proportionally to a card and may include a cutout for a battery. The second layer may be, for example, "L" shaped layer. The third layer of the circuit board may generally be rectangular and may be sized smaller than a card.

Prior to or during lamination, the first and second layers may be aligned such that the magnetic stripe communication device cutout of the first layer is aligned to the read head detectors of the second layer, and such that the battery cutouts of the first and second layers are aligned. The third layer may be positioned to overlap the first and second layers including the battery cutout (e.g., may provide a base for the battery), but may not extend into a region including the cutout for the magnetic stripe communication device and the read head detectors. The antenna of the third layer may be along the entire perimeter of the third layer and may be aligned so as not to interfere with the magnetic stripe communication device.

According to at least one example embodiment, the first and second layer may be on opposite sides of a top sheet, for example, a polyimide sheet. The cutout of the first layer may be a removal and/or absence of the first layer such that the sheet is exposed. A magnetic stripe communications device may be on the sheet. The third layer may be on, for example, a separate, bottom sheet (e.g., polyimide sheet). As one example, the second layer (e.g., a portion of the second layer) may be directly on the bottom sheet surface (e.g., no coverlay and/or the like) and the third layer may be on an opposite side of the bottom sheet from the second layer. The third layer and the bottom sheet may be a size of a portion of a card not including a magnetic stripe communications device. An antenna may occupy some or all of the bottom sheet as part of the third layer.

A multiple layer primary circuit board configuration may decrease a circuit board thickness in the magnetic stripe communication device region (which may be designed as thin as possible), may increase and/or maximize an RFID antenna size to improve communication gain, facilitate the inclusion of three or more reader communication devices in a single card, and improve overall communication performance of the reader communication devices.

Multiple boards may be soldered together. Different boards may also be mechanically and electrically coupled together, for example, via an epoxy or conductive tape. The various components of a card may be part of different circuit boards and/or separate components attached to the circuit boards. The separate components of each card may be, for example, assembled onto the boards. For example, a microprocessor die may be coupled to contacts of a portion of a board. The electronics package may then be laminated. Such a lamination may occur, for example, in an injection molding process (e.g., a reaction injection molding process) and/or the like. A laminate may be, for example, a silicon-based material or a polyurethane-based material.

Cards may be personalized using various types of wireless signals. For example, a card may include an infrared sensor. A personalization machine may include an IR transmitter. The IR transmitter may communicate personal data, such as one or more credit and/or debit card numbers, to an IR sensor located on the card. Similarly, a visible light sensor may be provided on a card for receiving visible light pulses from a visible light transmitter that are indicative of personal data for a card. Alternatively or additionally, for example, a wire-based signal may be provided to a card for personalization. For example, a card may include an IC chip that has contacts exposed on the surface of the card. Electrical connections may be made to such exposed contacts to provide personal data into the chip. Contacts may be placed on the card and connected to an embedded, non-exposed microprocessor such that the microprocessor may receive programming data from a wire-based connection.

An adapter may be provided that includes an infrared or visible light transmitter. Such an adapter may be provided over a contact for an IC chip communications device. Accordingly, an IC chip communications device may provide electronic signals to program, for example, an IC-chip card. However, an adapter may convert, for example, these electronic signals into visible or infrared bursts of light. Accordingly, an IC chip programmer may be utilized to program a card having an infrared or visible light sensor. Furthermore, for example, an adapter may be placed over a magnetic stripe encoder or an RFID signal generator that generates infrared or visible light pulses in response to magnetic stripe encoding signals or RFID programming signals. Where a card uses multiple reader communication devices, a processor may couple each device such that data may be communicated to the card only once during personalization.

BRIEF DESCRIPTION OF THE DRAWINGS

Principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
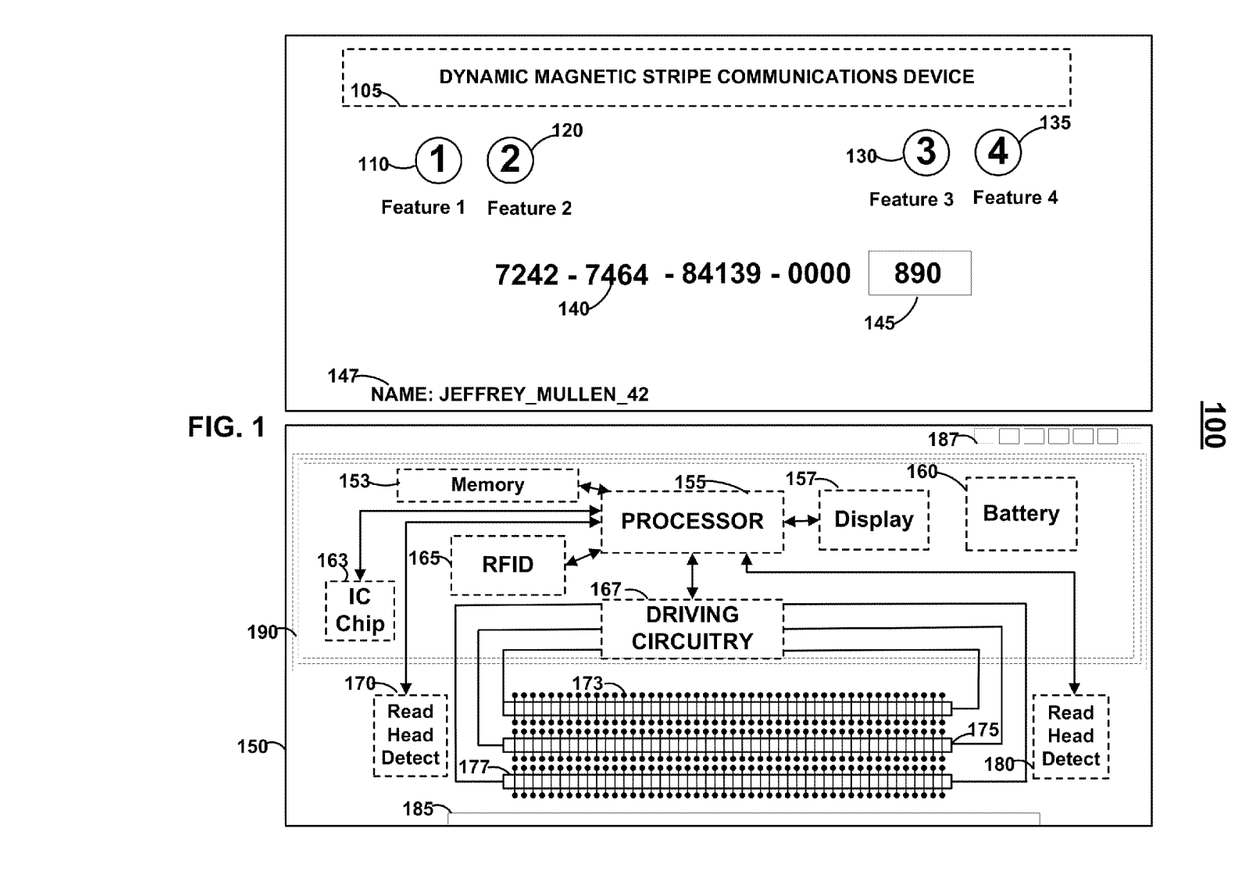
FIG. 1 shows cards and architectures constructed in accordance with the principles of the present invention.

FIG. 1 shows cards and architectures according to example embodiments. Referring to FIG. 1, card 100 may include, for example, dynamic magnetic stripe communications device 105, one or more displays (e.g., dynamic code display 145), permanent information 147, one or more buttons (e.g., buttons 110, 120, 130 and 135) and/or information 140. Information 140 may be, for example, a transaction number (e.g., account number), and may be permanent and/or information in a display. In the case of information 140 that is permanent, information 140 may be, for example, printed, embossed and/or laser etched on card 100.

Permanent information 147 may include, for example, information specific to a user (e.g., a user's name and/or username) and/or information specific to a card (e.g., a card issue date and/or a card expiration date).

Buttons 110-135 may be mechanical buttons, capacitive buttons, or a combination of mechanical and capacitive buttons. Button 110 may be used, for example, to communicate information through dynamic magnetic stripe communications device 105 indicative of a user's desire to communicate a single track of magnetic stripe information. Persons skilled in the art will appreciate that pressing a button (e.g., button 110) may cause information to be communicated through device 105 when an associated read-head detector detects the presence of a read-head of a magnetic stripe reader. Buttons 120, 130 and 135 may be utilized to communicate (e.g., after a button is pressed and after a read-head detects a read-head of a reader) information indicative of a user selection (e.g., to communicate two or more tracks of magnetic stripe data, to communicate different track data, to modify tracks of data and/or the like).

Buttons 110-135 may each be used to associate a feature to a transaction. For example, each of buttons 110-135 may be associated to different service provider applications. Each service provider application may be associated to a different service provider feature (e.g., different rewards). A user may, for example, press one or more of buttons 110-135 to choose one or more features for a particular transaction.

A user may associate applications to buttons and/or features to applications, for example, on a graphical user interface (GUI). The graphical user interface may be, for example, an application manager provided by one or more entities (e.g., an application manager provider). The associations may be changed, for example, at any time, periodically, and/or upon the occurrence of an event. According to some example embodiments, a user may associate applications to buttons and/or features to applications by telephone, by electronic mail and/or any other communication method.

Associations between buttons and service provider applications may be maintained by an ecosystem provider, for example, within an ecosystem of applications, transactional methods and types of transactions. When a transactional method (e.g., card 100) is used by a user, the ecosystem provider may receive transactional data and information indicative of a button selected by the user. The ecosystem provider may determine the identity of an application associated to the button, and may communicate some or all of the information and/or transactional data to the application and/or the service provider. The service provider and/or the application may provide a feature associated with the application based on the information and/or transactional data.

Different features may be provided based on the use of different transactional methods and/or transaction types. For example, suppose a service provider provides a reward feature based on the use of a particular payment method (e.g., a reward for using a particular credit card). A user may purchase an item using the particular payment method (e.g., may select a particular credit account using buttons 110-135). When the purchase is performed, the reward may be communicated to the user. As another example, suppose a service provider provides a reward feature based on a type of transaction. For example, a reward may be provided for a sale of a commodity using a particular transaction processor (e.g., issuer, acquirer and/or payment network). A user may sell a commodity using a the particular transaction processor (e.g., the ecosystem provider) and upon completion of the sale a reward may be communicated to the user.

Selection of a feature may or may not have a cost associated with it. If a cost is associated with the feature, for example, the cost may be added to a customer's statement (e.g., added to a credit or debit purchase) for a particular transaction. A fixed-fee and/or variable-fee (e.g., a percentage of the transaction) may then be removed from the fee charged to the user and distributed among particular parties, for example, distributed among a card issuer, application manager provider, ecosystem provider, device provider, service provider and/or one or more other entities. Persons skilled in the art in possession of example embodiments will appreciate that many different fee arrangements are possible, and that the various providers may be the same and/or different from each other.

A cost may be associated to a feature selection, but may not be a cost to a user. For example, the cost may be a cost to a service provider (e.g., a third party service provider). The cost may be provided to other entities, for example, the device provider, card issuer, card processor, and/or any other entity (e.g., a card network). For example, a feature provided to a user acting as a merchant may be an instant rebate provided to the customer of the user, and a cost of the instant rebate may be a cost to the rebate provider.

Display 145 may display, for example, a dynamic verification code (e.g., a card verification value (CVV) and/or card identification number (CID)). The dynamic number displayed on display 145 may change according to various schemes as a security measure against fraudulent transactions. Any and/or all of the information provided by a card 100 may be provided via a display. For example, information 140 may be a dynamic number provided via a display. The dynamic numbers may change periodically and/or upon the occurrence of an event such that a previously recorded number may become unusable. According to at least one example embodiment, one or both sides of a card 100 may be entirely a display.

Card 100 and/or a user may communicate a dynamic number to a processing facility. The processing facility may validate the dynamic number (e.g., a dynamic credit card number and/or a dynamic security code). A user may purchase items using a dynamic card and a processing facility may authorize the purchases upon determining that the dynamic number is valid. Although example embodiments may be described with respect to numbers, the scope of example embodiments includes any distinguishing representation of a security code and/or account, by any sensory method (e.g., sight, sound, touch and/or the like). Characters, images, sounds, textures, letters and/or any other distinguishable representations are contemplated by example embodiments.

Architecture 150 may be utilized with any card (e.g., any card 100). Architecture 150 may include, for example, processor 155, display 157, driving circuitry 167, memory 153, battery 160, radio frequency identification (RFID) 165, integrated circuit (IC) chip 163, electromagnetic field generators 173, 175, and 177, read-head detectors 170 and 180, port 187 (e.g., a joint test action group (JTAG) port), and an RFID antenna 190.

Processor 155 may be any type of processing device, for example, a central processing unit (CPU), an analog signal processor and/or a digital signal processor (DSP). Processor 155 may be, for example, an application specific integrated circuit (ASIC). Processor 155 may include on-board memory for storing information (e.g., drive code). Any number of components may communicate to processor 155 and/or receive communications from processor 155. For example, one or more displays (e.g., display 157) may be coupled to processor 155. Persons skilled in the art will appreciate that components may be placed between particular components and processor 155. For example, a display driver circuit may be coupled between display 157 and processor 155.

Memory 153 may be coupled to processor 155. Memory 153 may store data, for example, data that is unique to a particular card. Memory 153 may store any type of data. For example, memory 153 may store discretionary data codes associated with each of buttons 110-135 of card 100. Discretionary data codes may be recognized by remote servers to effect particular actions. For example, a discretionary data code may be stored in memory 153 and may be used to cause a third party service feature to be performed by a remote server (e.g., a remote server coupled to a third party service such as an online voucher and/or coupon provider).

Different third party features may be, for example, associated with different buttons and a particular feature may be selected by pressing an associated button. According to at least one example embodiment, a user may select a type of payment on card 100 via manual input interfaces. The manual input interfaces may correspond to displayed options (not illustrated) and/or may be independent buttons. Selected information may be communicated to a magnetic stripe reader via a dynamic magnetic stripe communications device, an RFID antenna and/or the like. Selected information may also be communicated to a device (e.g., a mobile telephonic device) including a capacitive sensor and/or other type of touch sensitive sensor.

Architecture 150 may include any number of reader communication devices. For example, architecture 150 may include at least one of IC chip 163, RFID 165 and a magnetic stripe communications device. IC chip 163 may be used to communicate information to an IC chip reader (not illustrated) using, for example, RFID antenna 190 and/or contact conductive fingers (e.g., 6 or 8 contact gold fingers). IC chip 152 may be, for example, an EMV chip. RFID 151 may be used to communicate information to an RFID reader using RFID antenna 190. RFID 151 may be, for example, a RFID tag. A magnetic stripe communications device may be included to communicate information to a magnetic stripe reader. For example, a magnetic stripe communications device may provide electromagnetic signals to a magnetic stripe reader.

Different electromagnetic signals may be communicated to a magnetic stripe reader to provide different tracks of data. For example, architecture 150 may include electromagnetic field generators 173, 175 and 177 to communicate separate tracks of information to a magnetic stripe reader. Electromagnetic field generators 173, 175 and 177 may include a coil (e.g., each may include at least one coil) wrapped around one or more materials (e.g., a soft-magnetic material and a non-magnetic material). Each electromagnetic field generator may communicate information, for example, serially and/or in parallel to a receiver of a magnetic stripe reader for a particular magnetic stripe track.

Architecture 150 may include read head detectors 170 and 180. Read-head detectors 170 and 180 may be configured to sense the presence of a magnetic stripe reader (e.g., a read-head housing of a magnetic stripe reader). A read-head detector may include, for example, e-sense pads. Information sensed by the read-head detectors 170 and 180 may be communicated to processor 155 to cause processor 155 to communicate information serially from electromagnetic generators 173, 175, and 177 to magnetic stripe track receivers in a read-head housing of a magnetic stripe reader.

According to at least one example embodiment, a magnetic stripe communications device may change the information communicated to a magnetic stripe reader at any time. Processor 155 may, for example, communicate user-specific and card-specific information using RFID 165, IC chip 163, and/or electromagnetic generators 173, 175, and 177 to card readers coupled to remote information processing servers (e.g., purchase authorization servers). Driving circuitry 167 may be utilized by processor 155, for example, to control electromagnetic generators 173, 175 and 177.

Architecture 150 may include, for example, a light sensor (not illustrated). Architecture 150 may receive information from a light sensor. Processor 155 may determine information received by a light sensor.

Figure 2:
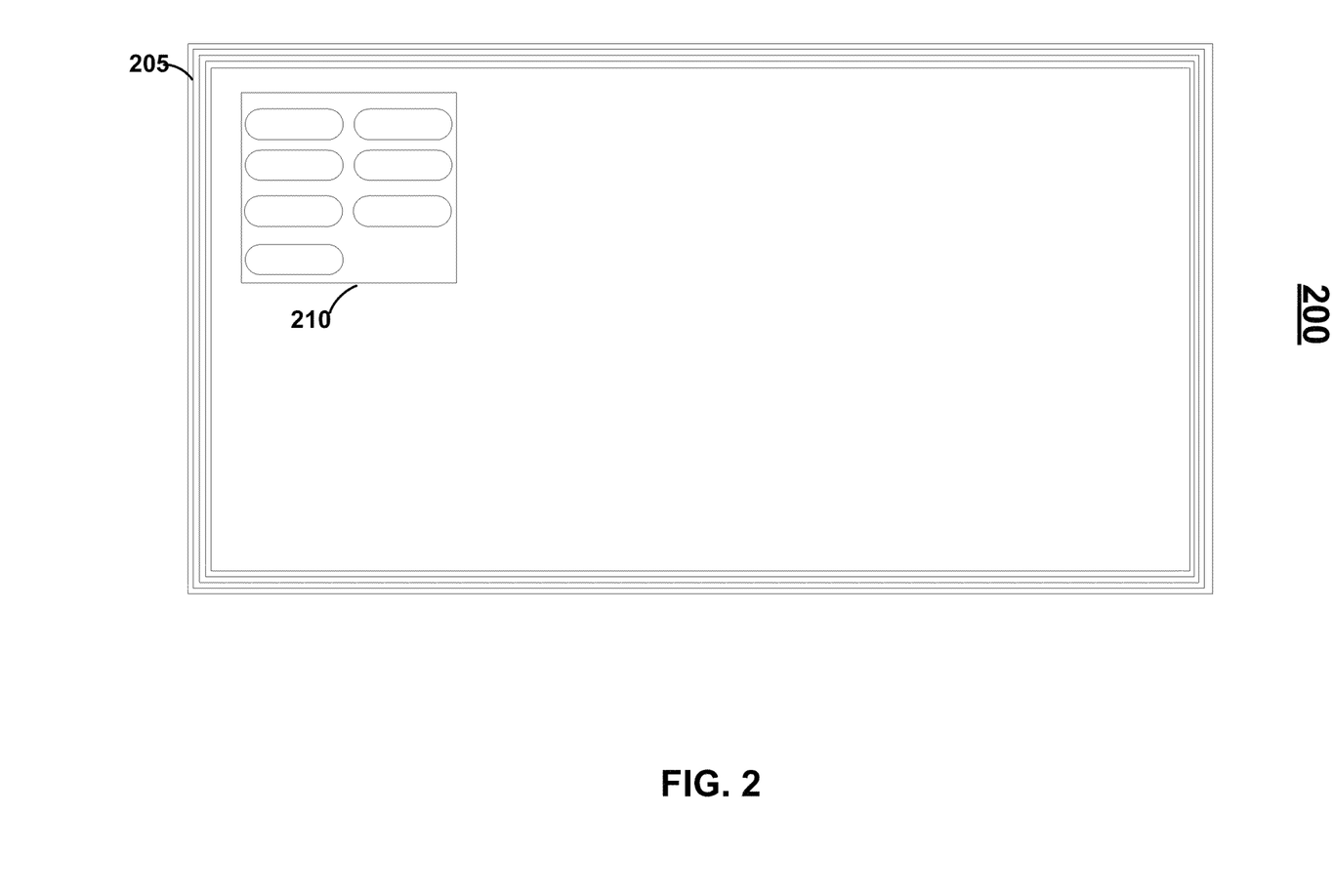
FIGS. 2-4 show card layers constructed in accordance with the principles of the present invention.
Figure 3:
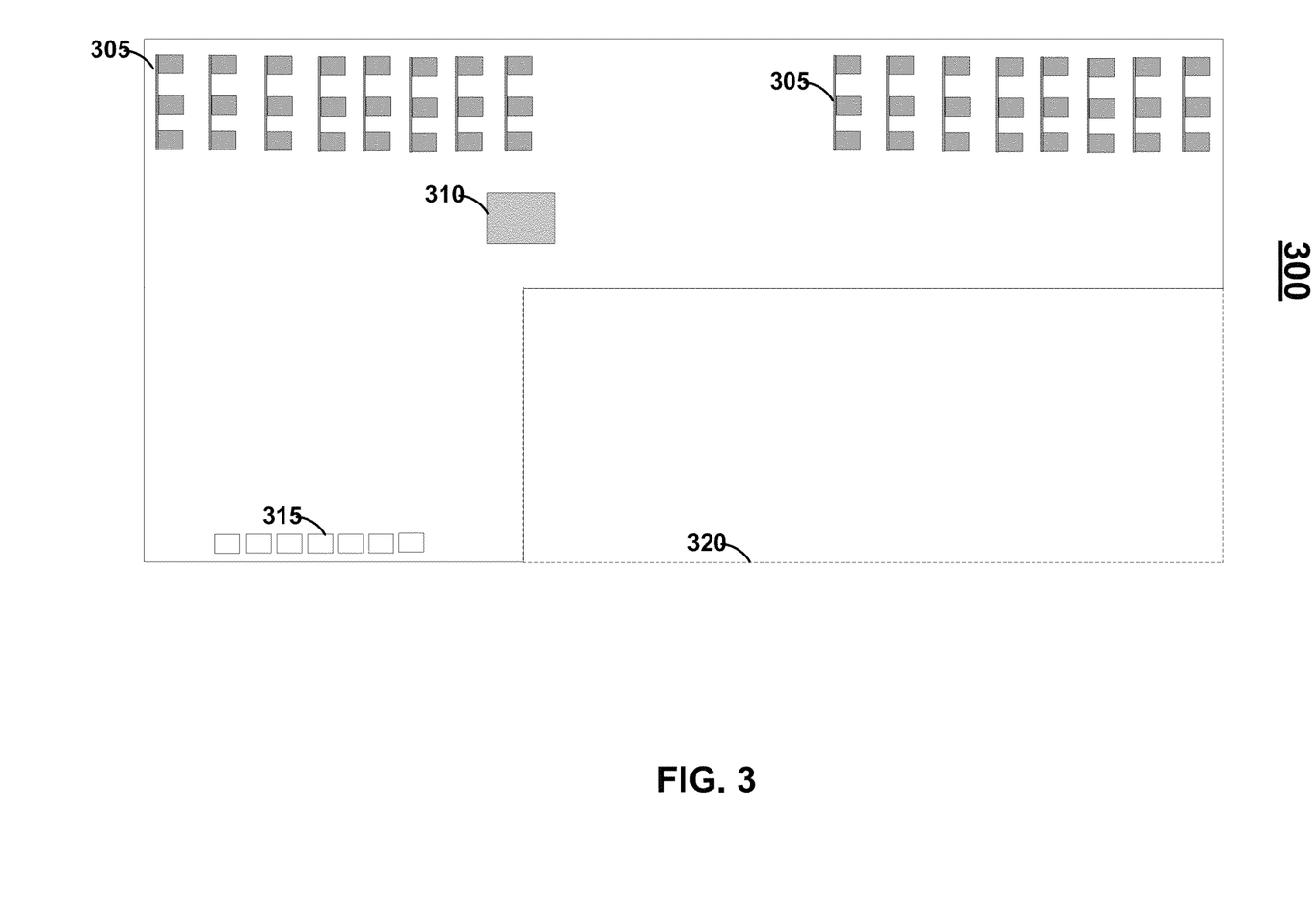
Figure 4:
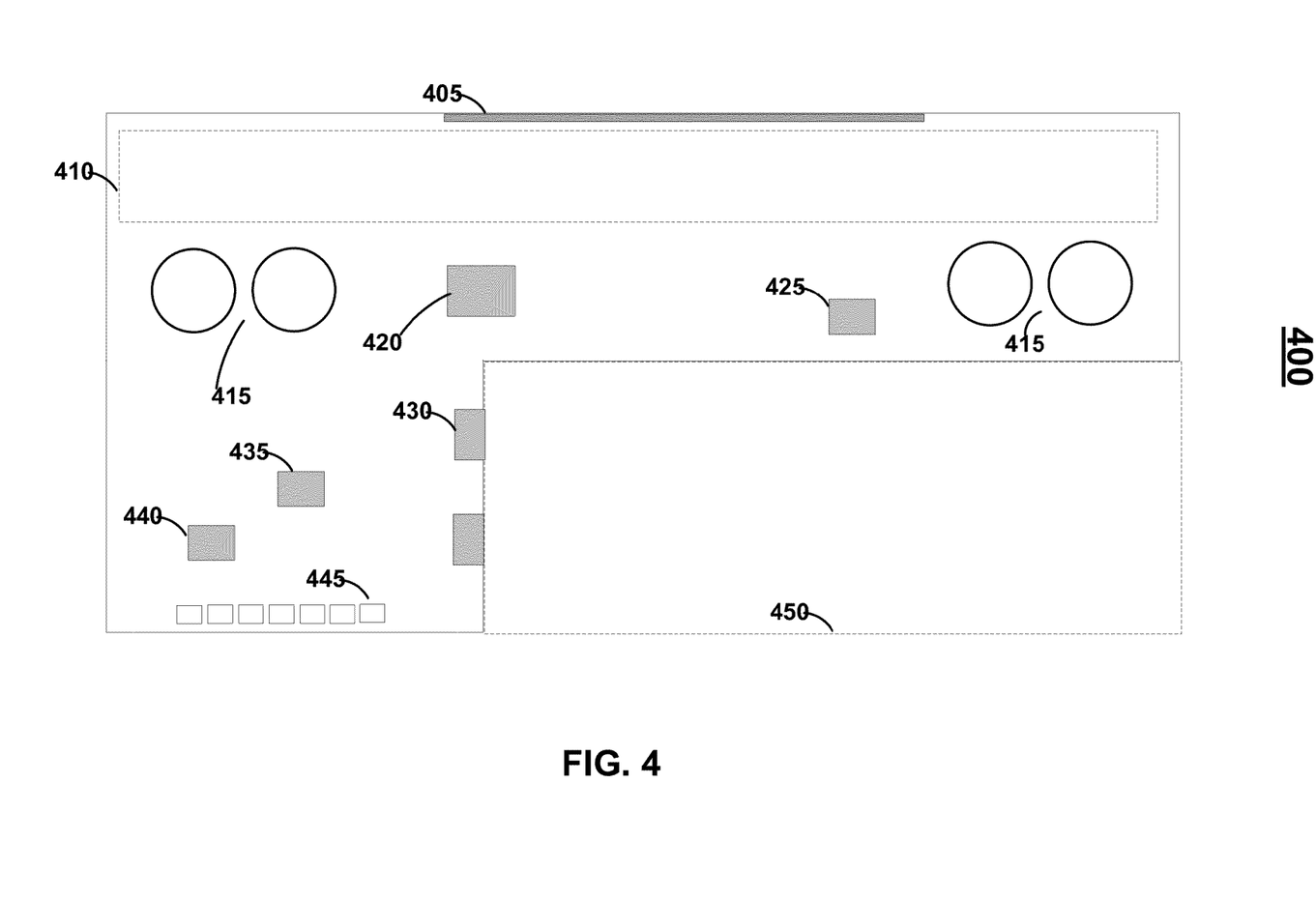

FIGS. 2-4 show card layers constructed in accordance with the principles of the present invention. Referring to FIG. 2, layer 200 of a printed circuit board may include, for example, RFID antenna 205 and EMV connector 210. Layer 200 may be about 1-3 mils thick (a mil being $1/1000$ of an inch), for example, about 2 mils thick. Persons of ordinary skill in the art will appreciate that layer 200 may also include various circuit traces, fill materials, supports, components, via connections and/or the like which may not be illustrated for clarity of explanation.

According to at least one example embodiment, layer 200 may be one side of a sheet, for example, one side of a polyimide sheet (e.g., a Kapton sheet). A side of a sheet including RFID antenna 205 and EMV connector 210 may be a bottom layer of a printed circuit board. A second side of the sheet may include a different layer. The different layer (not shown) from layer 200 may include routing traces and/or other elements. According to at least one example embodiment, the second side of the sheet may not include a different layer and/or metallization (e.g., copper), for example, may be bare polyimide.

An RFID antenna may, for example, be a series of conductive loops on a border of layer 200. RFID antenna 205 may be operable to communicate information provided by a processor externally to a distance of about, for example, 100 millimeters. For example, a processor may communicate with an RFID device using RFID antenna 205. RFID antenna 205 may be utilized to communicate, for example, payment card information (e.g., credit card information) to a reader. Although RFID antenna is described with respect to RFID, persons of ordinary skill in the art will appreciate that near field communications provided by an antenna may be used for various other technologies, for example, contactless EMV.

RFID antenna 205 may communicate an electromagnetic signal in response to a signal provided by, for example, an RFID chip (e.g., an application specific integrated circuit (ASIC) and/or the like). A size of the conductive loops may be large (e.g., as large as possible) and may be along edge portions of layer 200 to maximize and/or increase a size of RFID antenna 205. Persons of ordinary skill in the art in possession of example embodiments will appreciate that increased antenna size may correspond to increased gain. RFID antenna 205 may be monostatic and/or bistatic, and may be tuned (or tunable) to a specific range of carrier frequencies. Although FIG. 2 illustrates a helical antenna, other configurations are contemplated by example embodiments (e.g., patch, crossed dipole and/or the like).

EMV connector 210 may be used to connect an EMV chip to an external device (e.g., an EMV device). For example, EMV connector 210 may include contact pads and/or the like used to connect a payment card to an EMV device during a transaction. An EMV chip (e.g., a processor) may be connected to EMV connector 210 via one or more circuit traces and a buffer, for example, a buffer that provides electrostatic discharge (ESD) protection and/or bi-directional control (not illustrated). A card may be operable to provide contactless EMV communications and, for example, an EMV chip may be connected by circuit traces to RFID antenna 205 alternatively to and/or additionally to EMV connector 210. An EMV chip may be a component added to a circuit board including layer 200 and/or may be part of a circuit board layer.

Referring to FIG. 3, layer 300 may include, for example, read head detectors 305, pad 310, supports 315 and/or component cutout 320. Persons of ordinary skill in the art will appreciate that layer 300 may also include various circuit traces, fill materials, supports, components, vias, via connections and/or the like which may not be illustrated for clarity of explanation. A thickness of layer 300 may be, for example, about 1-4 mils (e.g., about 2 mils).

Persons skilled in the art will appreciate that a read-head housing of a magnetic stripe reader may be provided with one, two, or three active read-heads that are each operable to couple with a separate magnetic track of information. A reader may also have more than one read-head housing and each read-head housing may be provided with one, two, or three active read-heads that are operable to each couple with a separate magnetic track including information. Such read-head housings may be provided on different surfaces of a magnetic stripe reader. For example, the read-head housings may be provided on opposite walls of a trough sized to accept payment cards. Accordingly, the devices on the opposite sides of the trough may be able to read a credit card regardless of the direction that the credit card was swiped.

A magnetic emulator may be provided and may be positioned on card such that when card is swiped through a credit card reader, the magnetic emulator passes underneath, or in the proximity of, a read-head for a particular magnetic track. An emulator may be large enough to simultaneously pass beneath, or in the proximity of, multiple read-heads. Information may be transmitted, for example, serially to one or more read-heads. Information from different tracks of data may also be transmitted serially and the magnetic stripe reader may determine the different data received by utilizing the starting and/or ending sentinels that define the information for each track. A magnetic emulator may also transmit a string of leading and/or ending zeros such that a magnetic reader may utilize such a string of zeros to provide self-clocking. In doing so, for example, information may be transmitted serially at high speeds to a magnetic stripe reader. For example, credit card information may be transmitted to a magnetic stripe reader at speeds up to, and/or greater than, about 30 Khz.

Different emulators may be provided, and positioned, on a card to each couple with a different read-head and each emulator may provide different track information to those different read-heads. Read-head detectors may be utilized to detect when a read-head is over an emulator such that an emulator is controlled by a processor to operate when a read-head detector detects the appropriate presence of a read-head. Power may be saved. The read-head detector may detect how many read-heads are reading the card and, accordingly, only communicate with the associated emulators. Power may be conserved.

Read-head detectors 305 may be, for example, provided as a circuit that detects changes in capacitance and/or mechanical coupling to a conductive material. Read head detectors 305 may be, for example, e-sense pads and/or the like. A processor may be provided to, for example, receive information from read-head detectors 305. Read head detectors 305 may be connected to the processor via circuit traces and/or the like.

Pad 310 may be, for example, a die foundation of a chip. For example, pad 310 may be a copper pad used to support a wire bonded on-board ASIC chip. Supports 315 may be, for example, supports for an external connector (e.g., a JTAG port). As one non-limiting example, supports 315 may be copper pads. Component cutout 320 may indicate the absence of symmetry in layer 300. For example, component cutout 320 may be an area not including layer 300 (e.g., not including layer 300 and/or a polyimide support layer). Although example embodiments may describe a component cutout, layer 300 may be formed without a portion corresponding to component cutout 320, may be an etched, milled, and/or ablated portion, and/or the like. A component, for example, a battery, may occupy some or all of a space provided by component cutout 320.

According to at least one example embodiment, layer 300 may be one side of a sheet, for example, one side of a polyimide sheet (e.g., a Kapton sheet). Layer 300 may be a middle layer of a printed circuit board. A different side of the sheet from the layer 300 may include a different layer, for example, a top layer. The different layer (not shown) from layer 300 may include, for example, an infrared (IR) transceiver, a component cutout, buttons, a processor, at least one circuit, leads, an EMV buffer, an RFID chip, a port and/or a component cutout. According to at least one example embodiment, layer 300 may be a standalone layer, for example, the only layer of a sheet.

Referring to FIG. 4, layer 400 may include, for example, infrared (IR) transceiver 405, magnetic stripe region 410, buttons 415, processor 420, circuit 425, leads 430, EMV buffer 435, RFID chip 440, port 445 and/or component cutout 450. Persons of ordinary skill in the art will appreciate that layer 400 may also include various circuit traces, fill materials, supports, components, via connections and/or the like which may not be illustrated for clarity of explanation. A thickness of layer 400 may be, for example, about 1-4 mils (e.g., about 2.7 mils).

IR transceiver 405 may include, for example, an IR emitter and an IR receiver. The IR emitter may be, for example, a light emitting diode configured to emit IR light upon excitation (e.g., application of a voltage across the diode). The IR receiver may be, for example, a transistor configured to generate a current in the presence of IR light. For example, the IR receiver may be a bipolar transistor. According to at least one example embodiment, IR transceiver 405 may not be a transceiver and may be a transmitter-receiver. IR transceiver 405 may be connected to, for example, processor 420 via one or more circuit traces (not illustrated). IR transceiver 405 may communicate information to/from an external IR reader and/or to/from processor 420. For example, IR transceiver 405 may communicate a card account number to an IR card reader.

Magnetic stripe region 410 may indicate the absence of a portion of layer 400. For example, magnetic stripe region 410 may indicate an area of a sheet (e.g., a polyimide sheet) not including any metallization (e.g., no copper, coverlay and/or the like). As another example, magnetic stripe region 410 may indicate the absence of any material. Although example embodiments may include a component cutout as a magnetic stripe region, layer 400 may be formed without a portion corresponding to magnetic stripe region 410, an etched, milled, and/or ablated portion, and/or the like. A component, for example, a magnetic stripe communication device, may occupy some or all of a space provided by magnetic stripe region 410 (e.g. directly on a polyimide sheet).

Buttons 415 may be mechanical buttons, capacitive buttons, or a combination of mechanical and capacitive buttons.

Buttons 415 may be connected to processor 420 via one or more circuit traces (not illustrated).

Processor 420 may be, for example, a central processing unit. For example, processor 420 may be an ultra-low-power mixed signal microprocessor. Processor 420 may provide various functions to a powered card including a layer 400. For example, a card EMV protocol may use processor 420. Processor 420 may include on-board memory for storing information (e.g., drive code). Any number of components may communicate to processor 420 and/or receive communications from processor 420. For example, one or more displays (not illustrated) and/or one or more memories may be coupled to processor 420. Persons skilled in the art will appreciate that components may be placed between particular components and processor 420. For example, a buffer circuit may be coupled between processor 420 and an EMV connector.

Circuit 425 may be, for example, an ASIC. Circuit 425 may be associated with a magnetic stripe communication device. Leads 430 may be, for example, battery terminal leads to connect a thin film, flexible battery to power various circuits (e.g., circuitry or components of various layers including layer 400). EMV buffer 435 may be connected between, for example, an EMV connector and processor 420. EMV buffer 435 may provide electrostatic discharge (ESD) protection and/or bi-directional control. RFID chip 440 may be, for example, connected to an RFID antenna (not illustrated) and may be operable to communicate, for example, payment card information (e.g., credit card information) to a reader. Port 445 may be, for example, a JTAG port connected to processor 420 and/or leads 430 via circuit traces (not illustrated).

Component cutout 450 may indicate the absence of symmetry in layer 400. For example, component cutout 450 may be an area not including layer 400. Although example embodiments may describe a component cutout, layer 400 may be formed without a portion corresponding to component cutout 450, may be an etched or otherwise removed portion and/or the like. A component, for example, a battery, may occupy some or all of a space provided by component cutout 450.

Persons skilled in the art in possession of example embodiments will appreciate that components of various layers of a circuit board may be distributed in various ways and remain within the scope of example embodiments.

According to at least one example embodiment, layer 400 may be one side of a sheet, for example, one side of a polyimide sheet (e.g., a Kapton sheet). Layer 400 may be a top layer of a printed circuit board. A different side of the sheet from the layer 400 may include a different layer, for example, a middle layer. The different layer (not shown) from layer 400 may include, for example, read head detectors, one or more pads, supports and/or component cutouts. According to at least one example embodiment, layer 400 may be a standalone layer, for example, the only layer of a sheet.

Figure 5:
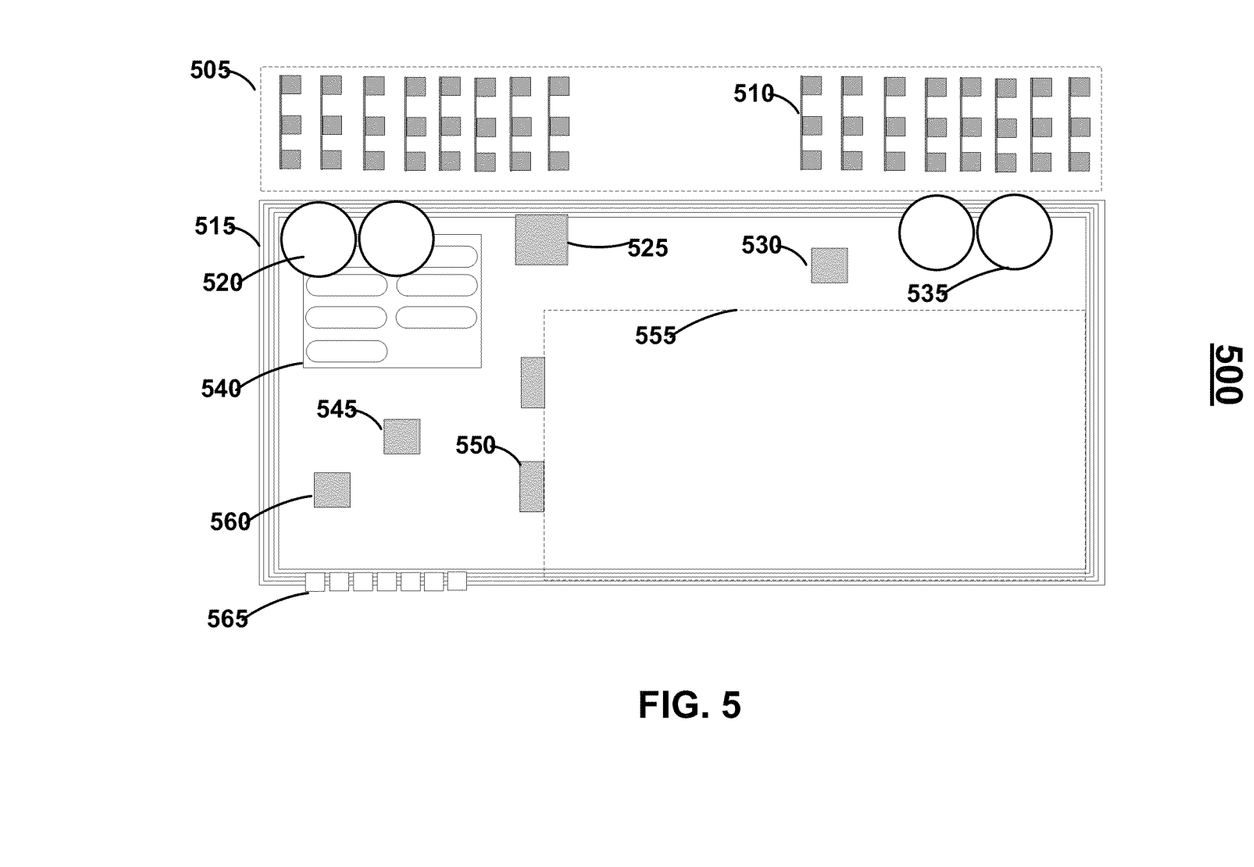
FIG. 5 shows overlaid card layers constructed in accordance with the principles of the present invention.

FIG. 5 shows overlaid card layers constructed in accordance with the principles of the present invention. Referring to FIG. 5, a printed circuit board may include multiple layers, for example, three layers including magnetic stripe cutout 505, read head detectors 510, antenna 515, buttons 520 and 535, processor 525, circuit 530, EMV connector 540, EMV buffer 545, leads 550, RFID chip 560, port 565 and/or component cutouts 555. Persons of ordinary skill in the art will appreciate that circuit board 500 may include various circuit traces, fill materials, supports, components, via connections and/or the like which may not be illustrated for clarity of explanation. Components, such as a magnetic stripe communication device, battery, backers and/or buttons, may or may not be part of circuit board 500 (e.g., may be separate components).

A first layer may include, for example, component cutouts 505 and/or 555, buttons 520 and 535, processor 525, circuit 530, EMV buffer circuit 545, leads 550, RFID chip 560 and port 565. A second layer may include, for example, read head detectors 510, a connector (not illustrated), supports (not illustrated) and/or component cutout 555. A third layer may include, for example, RFID antenna 515 and/or EMV connector 540.

According to at least one example embodiment, the first and second layers may be on opposite sides of a same sheet (e.g., a Kapton sheet). The third layer may be on a different sheet. The different sheet may only include the third layer and an opposite side of the sheet from the third layer may not include metallization (e.g., no coverlay). According to at least one other example embodiment the opposite side of the sheet from the third layer may include routing traces, elements, and/or the like (e.g., a fourth layer). According to at least one example embodiment, each layer of a circuit board may be associated with a different substrate layer.

Circuit board 500 may include a cutout 555 that may extend through the first and second layers. A component such as a battery may be on the third layer and pass through the first and second layers.

The third layer may extend to about a portion of the printed circuit board 500 including read head detectors 510 of the second layer and/or a magnetic stripe communication device (not illustrated). For example, a magnetic stripe communication device may be a component on a polyimide sheet over read head detectors 510 of the second layer and in magnetic stripe cutout 505 of the first layer. Magnetic stripe region 505 may indicate, for example, the absence of elements on the first layer opposite the read head detectors 510. The third layer may not extend into a region including read head detectors 510 and/or a magnetic stripe communication device. According to at least one example embodiment, a sheet including the third layer may not extend into a region including read head detectors 510 and/or a magnetic stripe communication device. The sheet may be between the third layer and the second layer.

Accordingly, interference between an RFID antenna 515 and a magnetic stripe communication device and/or read head detectors may be reduced. RFID antenna 515 may surround an area of a circuit board 500 not including the magnetic stripe communication device. A thickness of circuit board 500 may be reduced in an area including a magnetic stripe communication device and a size of an RFID antenna increased, as compared to, for example, a circuit board not including three or more layers. Communications using an RFID antenna 515 and/or a magnetic stripe communication device may be improved. For example, circuit board 500 may provide improved gain.

Figure 6:
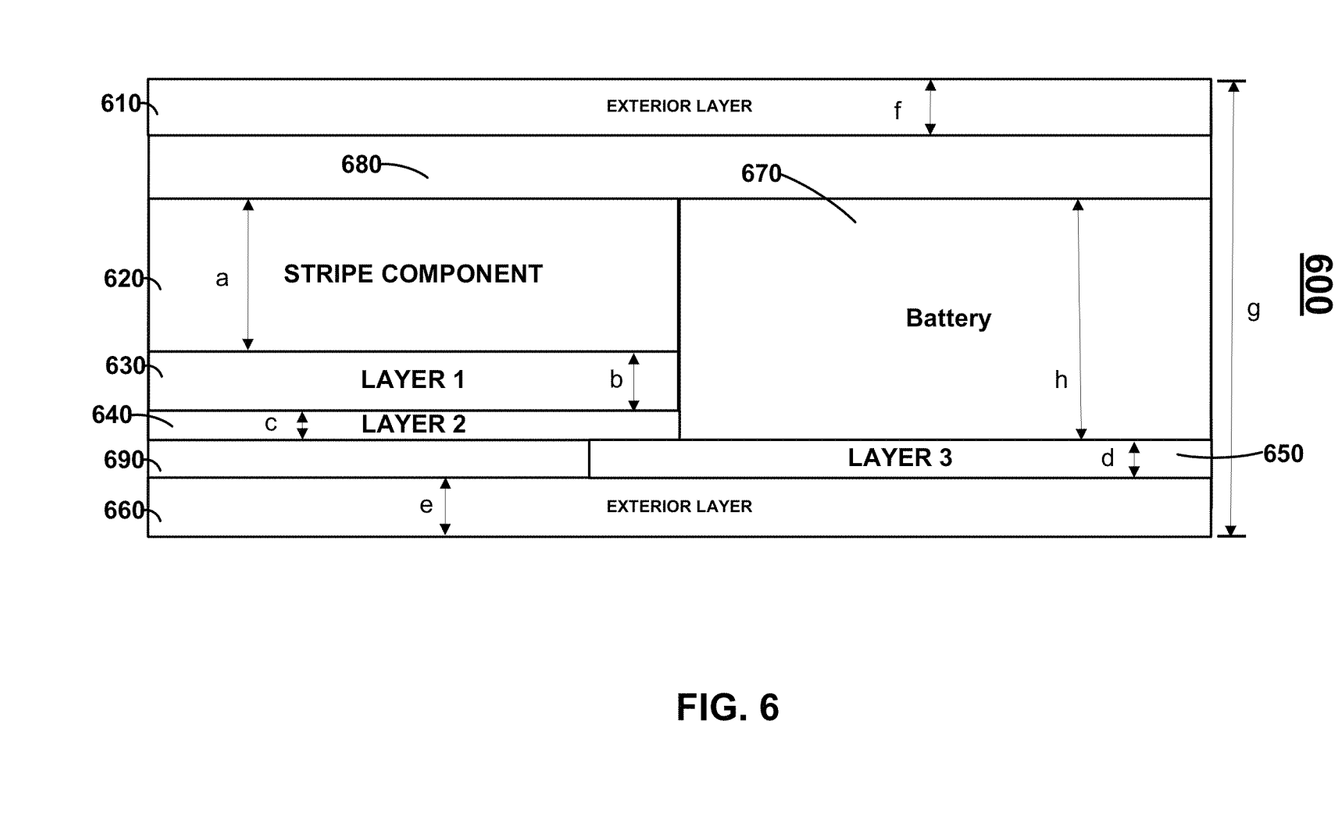
FIGS. 6 and 7 show cards in accordance with the principles of the present invention.

FIG. 6 shows a card in accordance with the principles of the present invention. FIG. 6 may be an example cross-sectional representation of a card taken in a thickness direction. Referring to FIG. 6, a card 600 may include, for example, first exterior layer 610, magnetic stripe communications device 620, first layer 630, second layer 640, third layer 650, second exterior layer 660, battery 670, region 680 and fill 690.

Magnetic stripe communications device 620 may be on first layer 630 (e.g., on a sheet including layer 630). A thickness "g" of card 600 may be, for example, about 25-40 mils (25-40 thousandths of an inch). For example, card 600 may be about 30-33 mils thick. Card 600 may include layers, components and/or the like with thicknesses "a"-"f" and "h".

Each of thicknesses "e" and "f" of exterior layers 610 and 660 may be, for example, about 3-8 mils (e.g., about 6 mils). Exterior layers 610 and 660 may include a polymer, for example, polyethelene terephthalate. A thickness "d" of third layer 650 may be about 1-3 mils (e.g., 2 mils). Thicknesses "b" and "c" of first and second layers 630 and 640 combined may be about 2-7 mils (e.g., about 4.7 mils). A thickness "h" of battery 670 may be about 14-20 mils (e.g., about 17 mils).

Region 680 may be a region including a material (e.g., an adhesive) and/or various elements (e.g., wire traces and/or the like). According to some example embodiments, region 680 may not be present or may be present as a fill material, and first layer 630 and/or battery 670 may extend to first exterior layer 610. Thickness "a" of the magnetic stripe communications device portion 620 may be, for example, a thickness of thickness "g" minus the combined thicknesses "a"-"f" and a thickness (if any) of region 680. Fill 690 may indicate a region of card 600 into which the third layer 650 does not extend. For example, the third layer 650 may include an RFID antenna and may not extend into a region of card 600 including a magnetic stripe communication device 620 or may only partially extend into a region of card 600 including a magnetic stripe communication device 620. Fill 690 may include, for example, epoxy.

As one non-limiting example, to fabricate a card that is about 30-33 mils thick, for example, exterior layers 610 and 660 may each be about 4-7 mils (e.g., 5 mils). A magnetic stripe communication device may be about 18-22 mils. A circuit board may be less than about 10-20 mils (e.g., less than about 16 mils). The magnetic stripe communication device may be on a portion of a circuit board layer with a thickness of about 1-3 mils (e.g., about 2 mils). Accordingly, for example, an area of region 680 between a magnetic stripe communications device and an exterior layer may be a thickness such that a magnetic stripe communications device, a circuit board layer (e.g., layer 640) on the magnetic stripe communication device, and exterior layers 610 and 660, are together about 30-33 mils thick. For example, region 680 may be about 0-10 mils thick (e.g., about 2 mils).

Persons of ordinary skill in the art will appreciate that the relative sizes of elements shown in FIG. 6 are representative only and depend on, for example, specific design and/or specific components. For example, magnetic stripe component 620 may be thicker than battery 670. Further, relative dimensioning may not be to scale in order to illustrate relative positioning in FIG. 6.

The volume of the electronics package of a powered card may be, for example, less than about two tenths of a cubic square inch (e.g., about less than one tenth of a cubic square inch). Such an electronics package may include multiple flexible boards, a battery, dynamic magnetic stripe communications device, magnetic stripe communications device drive circuitry, and multiple light emitting diodes, for example. There may be no copper pour in card 600. A thickness of card 600 may be uniform or may vary (e.g., a flexible card).

Persons skilled in the art will appreciate that a protective layer may be placed over exterior layers 610 and 660. Such a layer may be about 0.5-2 mils thick (e.g., about 1 mil thick). Accordingly, for example, the combined thickness of two protective layers may be about 2 mils, the combined thickness of two exterior layers may be about 8 mils, the thickness of a circuit board layer including read heads may be 2 mils and the thickness of a magnetic stripe communication device may be about 18 mils. In order to maintain a target thickness of about 30 mils (e.g., with a maximum thickness of about 32 mils including personalization) for a card 600, a third layer (e.g., including an antenna) may not overlap a region of card 600 including a magnetic stripe communication device.

Persons skilled in the art will appreciate that different components and layers may be of different thicknesses based on the design of a card, and that example embodiments may be applied in a wide variety of scenarios to maintain a critical thickness. Persons skilled in the art will appreciate that an injection molding process of a substance may allow a substance to fill into the groove and gaps of an electronics package such that the laminate may reside, for example, between components of an electronics package.

Card 600 may include a permanent magnet that may be, for example, provided as part of an assembled magnetic stripe communication device 620. First through third layers 630-650 may include, for example, capacitive read-head detectors. Battery 670 may be any type of battery, such as, for example, a flexible lithium polymer battery. Circuitry may be included (not illustrated), for example, one or more driver circuits (e.g., for a magnetic communications device), RFIDs, IC chips, light sensors and light receivers (e.g., for sending and communicating data via optical information signals), sound sensors and sound receivers, or any other component or circuitry for card 600. Read-head detectors for detecting the read-head of a magnetic stripe reader may be provided, for example, on layer 640 as capacitive touch sensors (e.g., capacitive-sensing contact plates).

Figure 7:
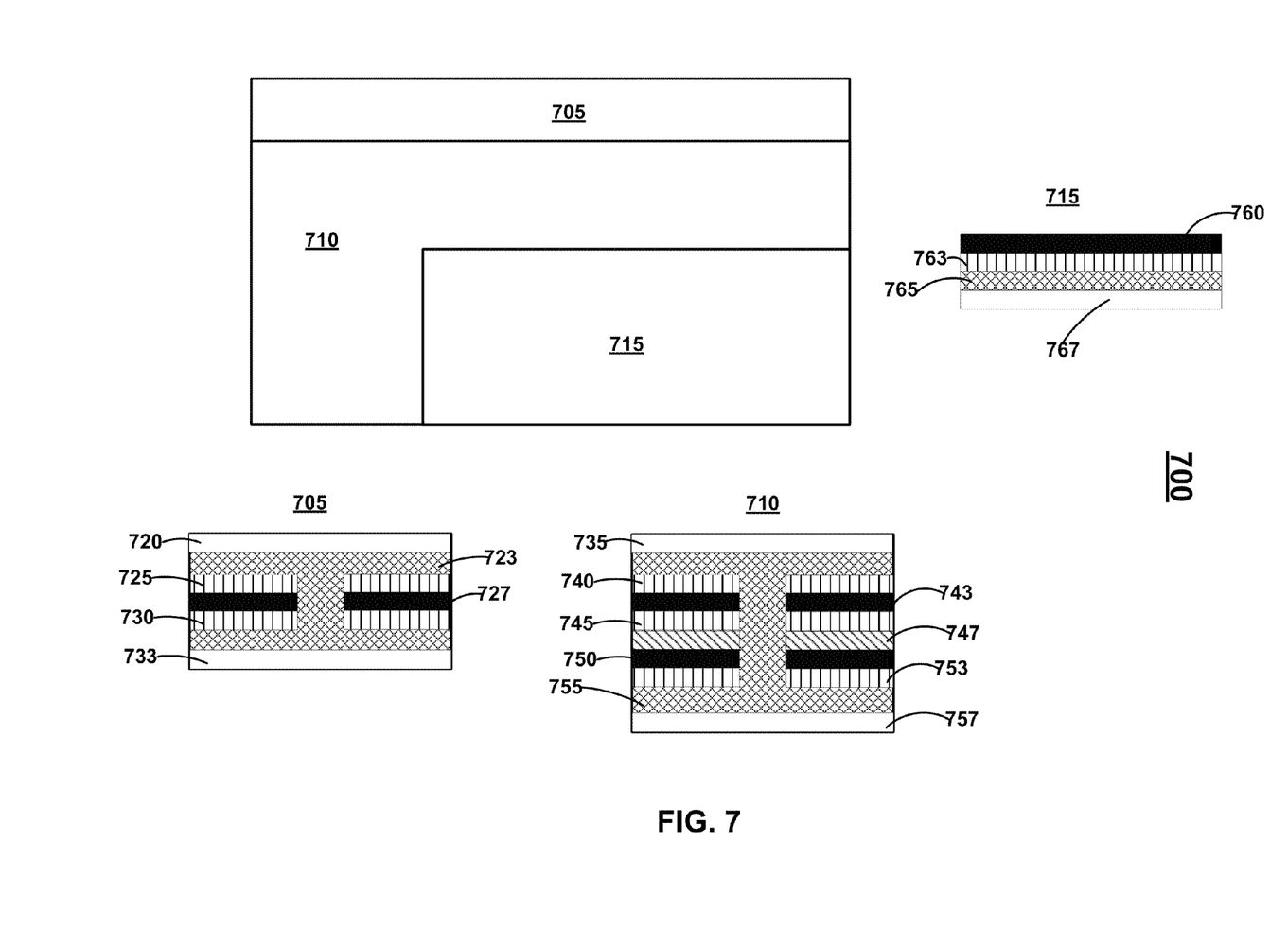

FIG. 7 shows a card in accordance with the principles of the present invention. FIG. 7 may include an example plan view of card 700 including regions 705, 710 and 715, and cross-sections corresponding to the regions.

Referring to FIG. 7, card 700 may include regions 705, 710 and 715. Region 705 may include, for example, first mask 720, first conductor 723, second conductor 725, substrate 727, third conductor 730 and second mask 733. Substrate 730 may be, for example, polyimide (e.g., Kapton). Second conductor 725 and third conductor 730 may be on opposite sides of substrate layer 730. Second conductor 725 and third conductor 730 may include, for example, electrically deposited metal (e.g., ED copper). First conductor 723 may be on exposed portions of substrate 727, second conductor 725 and third conductor 730, and may fill vias, depressions and/or the like. First conductor 723 may be, for example, metal plating (e.g., copper plating). Mask 720 and mask 733 may be on first conductor 723. Mask 720 and mask 733 may be, for example, top and bottom solder masks (e.g., coverlay), respectively.

Region 710 of card 700 may include, for example, first mask 735, first conductor 755, second conductor 740, first substrate 743, third conductor 745, bonding material 747, second substrate 750, fourth conductor 753 and second mask 757. First substrate 743 and second substrate 750 may be, for example, polyimide (e.g., Kapton). Second conductor 740 and third conductor 745 may be on opposite side surfaces of first substrate 743. Fourth conductor 753 may be on a side surface (e.g., bottom surface) of substrate 750. Second conductor 740, third conductor 745 and fourth conductor 753 may include, for example, electrically deposited metal (e.g., ED copper). Bonding material 747 may be between substrate 750 and third conductor 745. Bonding material 747 may be, for example, a bonding sheet.

First conductor 755 may be on exposed portions of substrate second conductor 740, first substrate 743, third conductor 745, bonding material 747, second substrate 750 and fourth conductor 753. First conductor 755 may fill vias, depressions and/or the like. First conductor 755 may be, for example, metal plating (e.g., copper plating). First mask 735 and second mask 757 may be on first conductor 755. First mask 735 and second mask 757 may be, for example, top and bottom solder masks (e.g., coverlay), respectively.

Region 715 of card 700 may include, for example, substrate 760, first conductor 763, second conductor 765 and mask 767. A top surface of substrate 760 may be exposed. Substrate 70 may be, for example, a polyimide. First conductor 763 may be on an opposite side of substrate 760 from the exposed top surface. First conductor 763 may be, for example, electrically deposited copper. Second conductor 765 may be on first conductor 763. Second conductor 765 may be, for example, copper plating. Mask 767 may be on second conductor 765. Mask 767 may be a solder mask (e.g., coverlay).

Persons skilled in the art will understand that although regions 705, 710 and 715 may be shown with different conductors, substrates and masks, according to some example embodiments materials may be common between regions. Persons skilled in the art will understand that regions 705, 710 and 715 may not be internally contiguous. For example, region 705 may include a magnetic stripe communication device cutout, and within such a cutout, substrate 727 may be exposed.

Persons skilled in the art will understand that various elements of different example embodiments may be combined in various ways. Persons skilled in the art will also appreciate that the present invention is not limited to only the embodiments described. Instead, the present invention more generally involves multiple layer card circuit boards. Persons skilled in the art will also appreciate that the apparatus of the present invention may be implemented in other ways than those described herein. All such modifications are within the scope of the present invention, which is limited only by the claims that follow.

What is claimed is:

1. A card comprising:
a circuit board including at least three layers,
wherein the at least three layers include a first layer, a second layer and a third layer, the second layer between the first and third layers,
a magnetic stripe communication device extends through the first layer, and
the third layer does not overlap a region of the card including the magnetic stripe communication device.

2. The card of claim 1, wherein a thickness of the card is about 30 mils.

3. The card of claim 1, wherein a thickness of the card is about 30 mils, and
a combined thickness of the at least three layers is less than about 10 mils.

4. The card of claim 1, wherein the card includes a plurality of reader communication devices.

5. The card of claim 1, wherein the card includes at least three reader communication devices.

6. The card of claim 1, wherein the circuit board includes an EMV chip, a radio frequency identification (RFID) chip an application specific integrated circuit (ASIC) associated with a magnetic stripe communication device.

7. A card comprising:
a circuit board including at least three layers,
wherein the at least three layers include a first layer, a second layer and a third layer, the second layer between the first and third layers,
a magnetic stripe communication device extends through the first layer, and the third layer includes an antenna, the antenna occupying the entirety of the third layer, the antenna not overlapping a region of the card including the magnetic stripe communication device.

8. A card comprising:
a circuit board including at least three layers,
wherein the at least three layers include a first layer, a second layer and a third layer, the second layer between the first and third layers,
a magnetic stripe communication device extends through the first layer,
a battery extends through the first layer and second layer, and
the third layer includes an antenna, the antenna including a coil occupying the entire peripheral region of the third layer, the antenna not overlapping a region of the card including the magnetic stripe communication device.

9. The card of claim 8, wherein a thickness of the card is about 30 mils.

10. A circuit board comprising:
a first layer including a processor, a radio frequency identification (RFID) chip, an application specific integrated circuit (ASIC) associated with a magnetic stripe communication device, an access port, an EMV buffer and battery pads;
a second layer including at least one head reader, a die foundation for the ASIC, and -a supports for the access port; and
a third layer including a connector and an antenna.

11. The circuit board of claim 10, wherein the antenna includes concentric conductive lines in a multi-turn, closed loop pattern occupying a portion of the circuit board off axis from a magnetic field generator of a magnetic stripe communication device.

12. The circuit board of claim 10, wherein the antenna includes concentric conductive lines in a multi-turn, closed loop pattern occupying a portion of the circuit board off axis from a current loop of a magnetic stripe communication device, and
no portion of the antenna is on axis with the current loop.

13. The circuit board of claim 10, wherein the third layer does not overlap a magnetic stripe communication device region.

14. A card comprising:
a first layer on a first substrate;
a second layer on an opposite side of the first substrate from the first layer;
a third layer on a second substrate, the second substrate between the third layer and the second layer; and
a battery on the second substrate,
wherein the battery is in a cutout extending through the first layer, the first substrate and the second layer.

15. The card of claim 14, wherein the first substrate includes a first polyimide material, and the second substrate includes a second polyimide material.

16. The card of claim 14, further comprising:
a magnetic stripe communication device,
wherein the first substrate includes a polyimide material, and
the magnetic stripe communication device is on the first substrate.

17. The card of claim 14, further comprising:
a magnetic stripe communication device,
wherein the first substrate includes a polyimide material and, the magnetic stripe communication device is directly on the first substrate, the magnetic stripe communication device being in a cutout of the first layer.

18. The card of claim 14, wherein a thickness of the card is about 30 mils.

19. A card, comprising:
a first layer on a first substrate;
a second layer on an opposite side of the first substrate from the first layer;
a third layer on a second substrate, the second substrate between the third layer and the second layer;
a magnetic stripe communication device; and a battery;
wherein the third layer includes an antenna,
the magnetic stripe communication device is directly on the first substrate, the magnetic stripe communication device being in a cutout of the first layer,
the antenna is part of the third layer,
the battery is in a cutout of the first layer, the first substrate and the second layer, and
the third layer and the second substrate do not extend into a region of the card including the magnetic stripe communication device.

20. A device comprising:
a first substrate;
a first layer on the first substrate, wherein the first layer exposes a portion of the first substrate;
a dynamic magnetic communications device on the exposed portion of the first substrate;
a second layer on an opposite side of the first substrate from the first layer;
a second substrate on an opposite side of the second layer from the first substrate, wherein the first layer, the first substrate and the second layer expose a portion of the second substrate,
a battery on the exposed portion of the second substrate; and
a radio frequency identification (RFID) antenna on an opposite side of the second substrate from the second layer, wherein the antenna overlaps the battery, and the antenna is non-overlapping with the dynamic magnetic communications device.

21. The card of claim 20, wherein a shape of the first substrate is about an "L" shape.

22. The card of claim 20, wherein a shape of the first substrate is about an "L" shape, and
a shape of the second substrate is about a rectangular shape.

* * * * *